United States Patent
Umeda et al.

(10) Patent No.: US 6,252,326 B1
(45) Date of Patent: Jun. 26, 2001

(54) STATOR OF VEHICLE AC GENERATOR WITH CIRCUMFERENTIALLY OFFSET COIL ENDS

(75) Inventors: Atsushi Umeda, Okazaki; Tsutomu Shiga, Nukata-gun; Shin Kusase, Obu, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/441,990

(22) Filed: Nov. 18, 1999

(30) Foreign Application Priority Data

Nov. 26, 1998 (JP) ................................. 10-335640

(51) Int. Cl.⁷ ................................. H02K 3/04; H02K 3/12
(52) U.S. Cl. ......................... 310/179; 310/198; 310/201
(58) Field of Search ................................. 310/179, 198, 310/201, 202, 208, 254

(56) References Cited

U.S. PATENT DOCUMENTS

| | | | |
|---|---|---|---|
| 957,866 | * 5/1910 | Chovan | 310/208 |
| 1,822,261 | * 9/1931 | Apple | 310/201 |
| 1,826,295 | * 10/1931 | Apple | 310/201 |
| 2,412,851 | * 12/1946 | Weiseman | 310/208 |
| 2,757,298 | * 7/1956 | Botts et al. | 310/208 |
| 4,602,180 | * 7/1986 | Olson | 310/201 |
| 4,827,172 | * 5/1989 | Kobayashi | 310/207 |
| 5,191,250 | * 3/1993 | Kobayashi | 310/208 |

FOREIGN PATENT DOCUMENTS

| 92/06527 | 4/1992 | (WO) . |
|---|---|---|
| 98/54823 | 12/1998 | (WO) . |

* cited by examiner

*Primary Examiner*—Karl Tamai
(74) *Attorney, Agent, or Firm*—Pillsbury Winthrop LLP

(57) ABSTRACT

A stator of a vehicle AC generator includes a stator core having a plurality of slots and a stator winding having a plurality of circumferentially aligned U-shaped conductor segments. One group of the U-shaped conductor segments have first turn portions and another group of U-shaped conductor segments have second turn portions enclosed by the first turn portions. The first turn portions and the second turn portions are shifted from one another in the circumferential direction to provide a distance therebetween for insulation as well as cooling air.

6 Claims, 4 Drawing Sheets

STATOR OF VEHICLE AC GENERATOR WITH CIRCUMFERENTIALLY OFFSET COIL ENDS

CROSS REFERENCE TO RELATED APPLICATION

The present application is based on and claims priority from Japanese Patent Application Hei 10-335640 filed on Nov. 26, 1998, the contents of which are incorporated herein by reference.

BACKGROUND OF THE INVENTION

1. Field of the Invention

The present invention relates to an AC generator for a vehicle and, particularly, a stator winding arrangement thereof.

2. Description of the Related Art

WO92/06527 discloses an ac generator's stator having U-shaped conductor segments inserted into respective stator's slots from an end of a stator core so that turn portions can be disposed circumferentially at one end of the stator. As the number of the conductor segments disposed in each slot increases, the number of the turn portions increases. In the stator having four conductor members in each slot, two conductor members are disposed at the front of the slot and two conductor members are disposed at the rear of the slot. Two conductor members extending from one slot in the same circumferential direction have respective turn portions aligned circumferentially. Therefore, as the number of the aligned turn portions increases the distance therebetween decreases, thereby making cooling effect of the stator winding worse. In other words, as the distance between the aligned turn portions decreases, cooling air supplied by an inside cooling fan can not smoothly flow from radially outward between the turn portions.

SUMMARY OF THE INVENTION

A main object of the invention is to provide an improved stator having conductor segments that can be cooled effectively.

According to an aspect of the invention, a stator of a vehicle AC generator includes a stator core having a plurality of slots and a stator winding including a plurality of circumferentially aligned U-shaped conductor segments.

The conductor segments are grouped into two: first segments having first turn portions, and second segments having second turn portions which are enclosed by the first turn portions. The first turn portions and second turn portions are shifted from one another in the circumferential direction.

In the stator, each of the first segments has two inclined portions having the same length which respectively extend from two slots and join together at the first turn portion, and each of the second segments has two inclined portions having different lengths which respectively extend from two slots and join together at the second turn portion.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
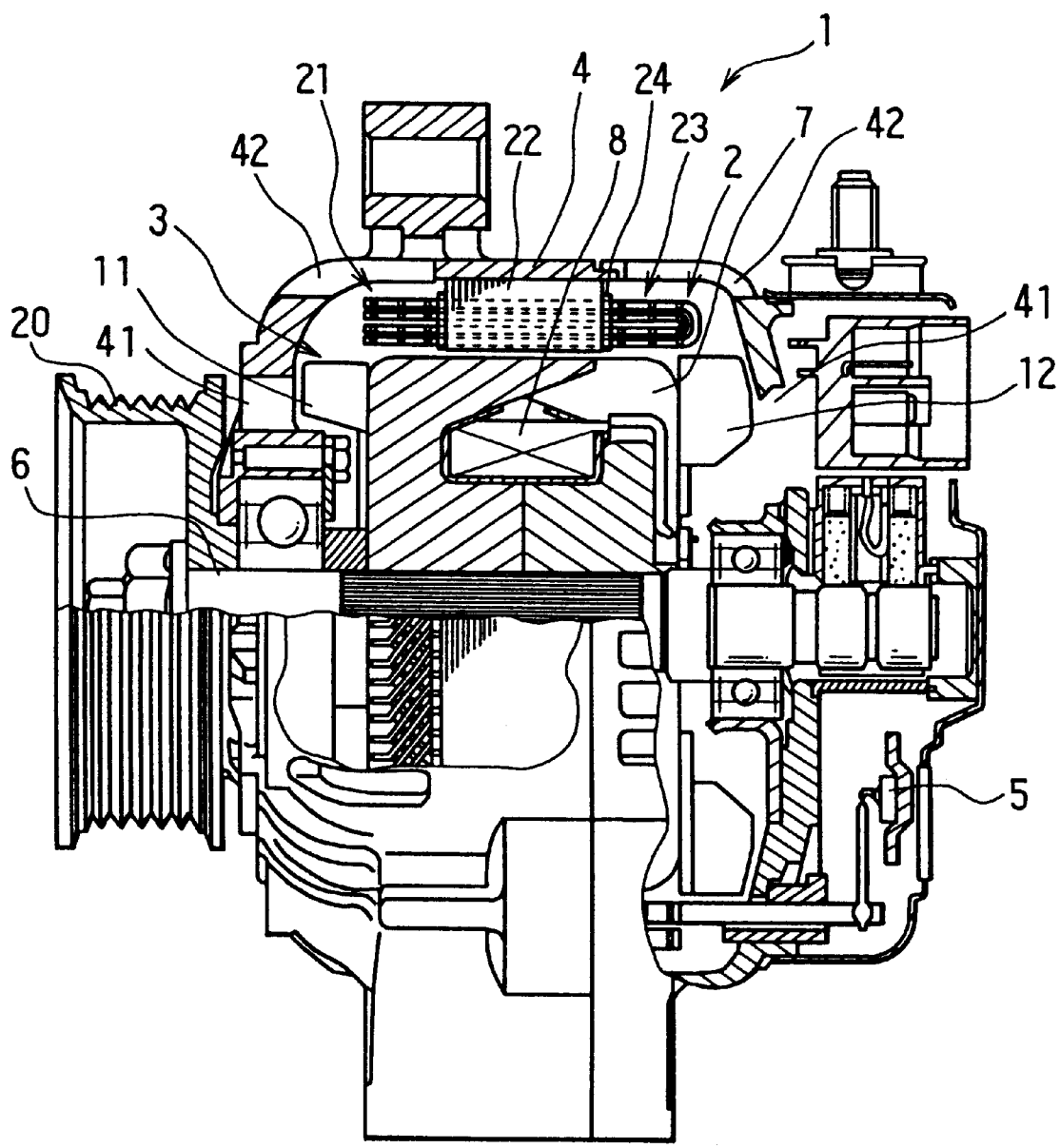
FIG. 1 is a partially cross-sectional side view of an ac generator for a vehicle according to a preferred embodiment of the invention.

In FIG. 1, an AC generator 1 includes stator 2, rotor 3, frame 4, rectifier 5 and others.

Stator 2 includes stator core 22, a plurality of base segment units 23 and insulators 24 insulating conductor segments 23 from stator core 22.

Rotor 3 includes field coil 8 formed of a cylindrically wound magnet wire and a pair of front and rear pole cores 7 each of which has six claw poles extending to enclose field coil 8. A mixed flow cooling fan 11 is welded by a welder to the front surface of front pole core 7, and a centrifugal cooling fan 12 is welded to the rear surface of rear pole core 7.

Frame 4 accommodates stator 2 and rotor 3. Rotor 3 is supported by frame 4 to be rotatable with shaft 6 and disposed inside stator 2 spaced at a prescribed air gap. Frame 4 has a plurality of air-intake windows 42 at portions opposite coil-ends of the stator winding and a plurality of air-discharge windows 41.

AC generator 1 is rotated by pulley 20, which is driven by an engine (not shown) through a belt. When field coil 8 is energized by an outside electric source, the claw poles of pole cores 7 are excited, so that three-phase electric voltage is generated in the stator winding and converted into a DC power by rectifier 5.

Figure 2:
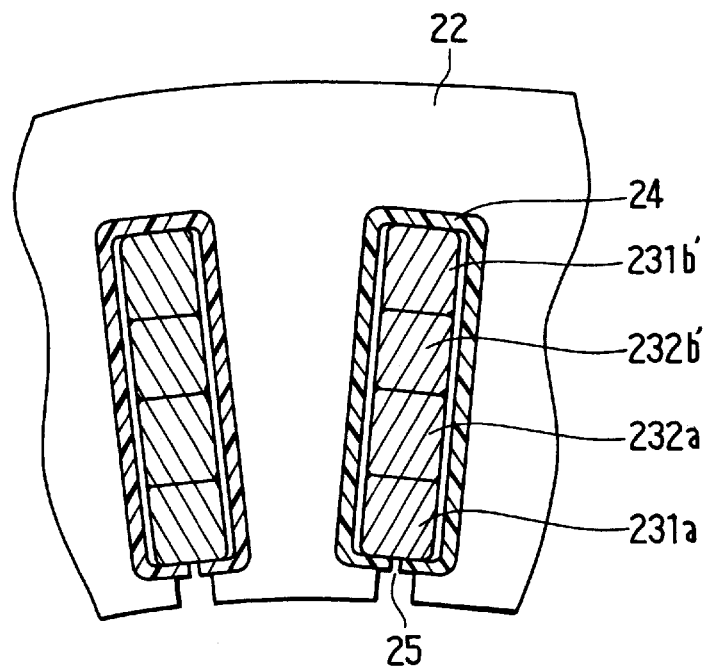
FIG. 2 is a fragmentary cross-sectional plan view of a stator of the ac generator according to the preferred embodiment of the invention.
Figure 3:
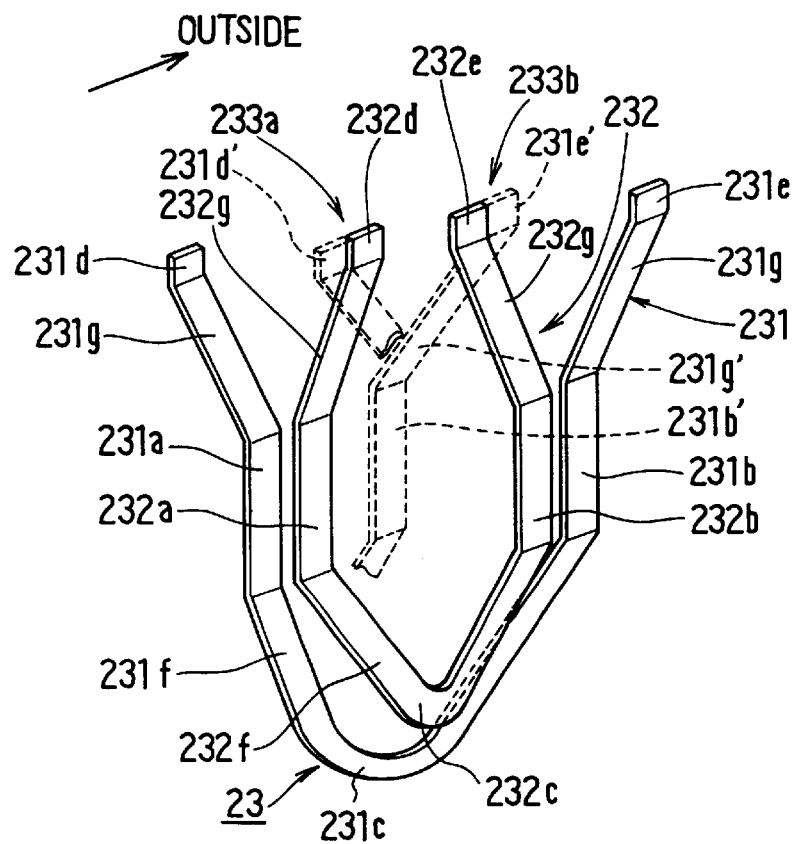
FIG. 3 is a perspective view of a pair of U-shaped conductor segments of the ac generator according to the preferred embodiment.

In FIGS. 2 and 3, the stator winding is disposed in the plurality of slots and is composed of a plurality of sets of an even number (e.g. four) of conductor members each slot. One set of four conductor members in one slot is, as shown in FIG. 2, has four conductor members aligned in four radial layers: innermost layer, inner middle layer, outer middle layer, and outermost layer.

Electric conductor 231a in the innermost layer of one slot 25 is paired with conductor member 231b in the outermost layer in another slot 25 that is a pole pitch spaced apart therefrom in the clockwise direction. In the same manner, conductor segment 232a in the inner middle layer of the same one slot 25 is paired with conductor member 232b in the outer middle layer in the same another slot 25 that is a pole pitch spaced apart therefrom in the clockwise direction. The paired conductor members 231a–231b and 232a–232b are joined by continuous portions via turn portions 231c and 232c at one end of stator core 22.

Therefore, the continuous portion that joins conductor member 231b in the outermost layer and conductor member 231a in the innermost layer via turn portion 231c encloses the continuous portion that joins conductor member 232b in the outer middle layer and conductor member 232a in the inner middle layer via turn portion 232c at the one end of stator core 22. Thus, in the one end of stator core 22, turn portion 232c, which is a joining portion of the one paired conductor members, is enclosed by turn portion 231c, which is a joining portion of the another paired conductor members disposed in the same two slots as the former conductor members. Thus, each of internal coil ends is formed by joining the conductor member 232a extending from the inner middle layer and the conductor member 232b extending from the outer middle layer, and each of external coil ends is formed by joining the conductor member 231a extending from the innermost layer and the conductor member 231b extending from the outermost layer.

Turn portions 231c included in the external coil-ends and turn portions 232c included in the internal coil-ends are shifted in the circumferential direction from each other to prevent the external and internal coil ends from overlapping with each other.

On the other hand, conductor member 232a in the inner middle layer is paired with conductor member 231a' in the innermost layer of another slot that is a pole pitch spaced apart from the slot having conductor member 232a in the clockwise direction. In the same manner, conductor member 231b' in the outermost layer of one slot 25 is paired with conductor member 232b in the outer middle layer of the slot that is a pole pitch spaced apart from the slot having conductor member 231b' therein in the clockwise direction. These conductor members are welded to one another at the other end of stator core 22.

Accordingly, external connection portion 233b of outermost conductor member 231b' and outer middle conductor member 232b and internal connection portion 233a of innermost conductor member 231a and inner middle conductor member 232a are shifted from each other in the circumferential direction. Thus, two coaxial and adjoining coil-end-rings are formed.

As shown in FIG. 3, innermost conductor member 231a and outermost conductor member 231b form U-shaped large segment 231, and inner middle conductor member 232a and outer middle conductor member 232b form U-shaped small segment 232. A pair of large and small segments 231 and 232 form base segment unit 23. Large and small segments 231 and 232 have axially extending straight in-slot portions and inclined portions 232f, 232g, 232f, and 232g. Coil-ends extending axially from opposite ends of stator core 22 are formed by the inclined portions. When cooling fans 11 and 12 are rotated, cooling air can pass through gaps formed between the inclined portions.

The above described structure is applied to all the segment units 23 disposed in all slots 25. In the coil ends at the end of stator core 22 opposite the turn portions, edge 231e' of the outermost conductor member 231b' and edge 232e of outer middle conductor member 232b are welded together, and edge 232d of inner middle conductor member 232a and edge 231d' of another outermost conductor member are welded together by a welder such as a super sonic welder or an arc welder, or soldered together to form external connection portions 233b and internal connection portion 233a, which are coated with insulation material to bridge a plurality of connection portions 233b and 233a. It is desirable to apply as thick insulation coatings as possible to only connection portions 233b and 233a.

Figure 4:
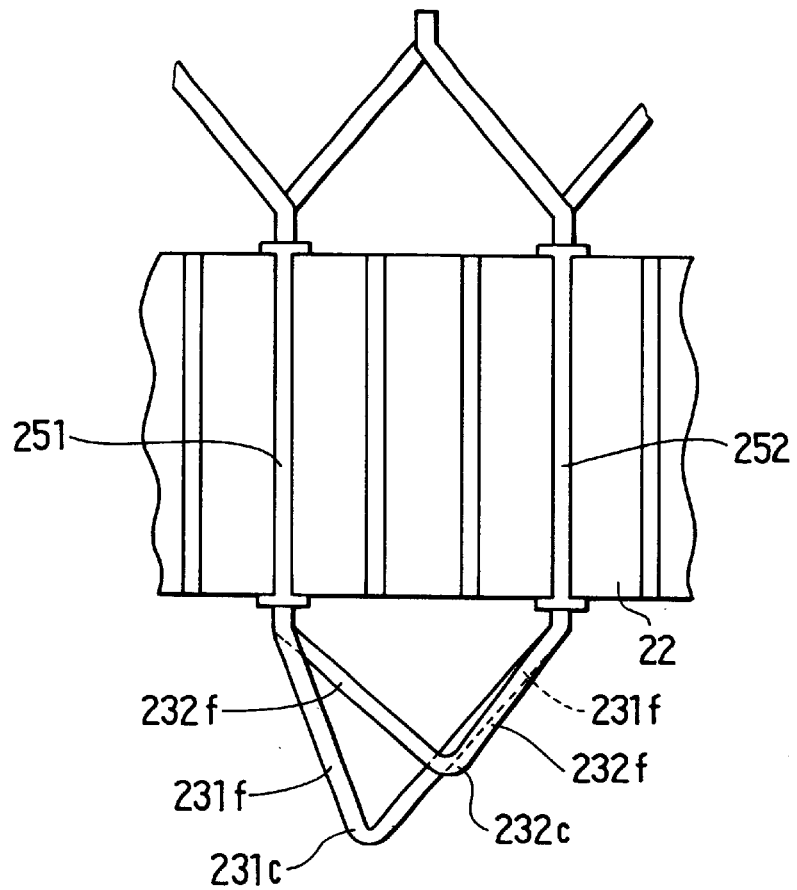
FIG. 4 is a fragmentary schematic side view of the stator.
Figure 5:
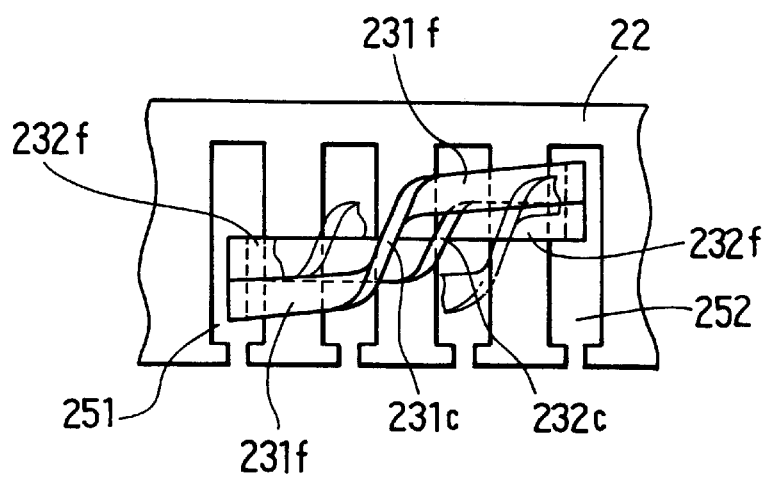
FIG. 5 is a fragmentary schematic front view of the stator.

As shown in FIGS. 4 and 5, turn portion 231c of the external coil-end joins inclined portion 231f extending from slot 251 and inclined portion 231f extending from slot 252 that is a pole pitch spaced apart therefrom. In the same manner, turn portion 232c of internal coil-end joins inclined portion 232f extending from slot 251 and inclined portion 232f extending from slot 252. Two inclined portions 231f disposed opposite sides of turn portion 231c and two turn portions 232f disposed opposite sides of turn portion 232c are portions of conductor members extending from slots 251 and 252. Two turn portions 231c and 232c are disposed not to overlap with each other by changing the ratio of length of respective inclined portions. For example, as shown in FIG. 5, the ratio of the length between inclined portion 231f extending from slot 251 and inclined portion 231f extending from slot 252 and the ratio of the length between inclined portion 232f extending from slot 251 and inclined portion 232f extending from slot 252 are different. Two turn portions 231c and 232c can be also shifted in the circumferential direction, so that each of turn portions 232c of the internal coil-ends are disposed between two turn portions 231c of the external coil-ends when viewed from an outside portion in the axial direction of stator core 22.

Figure 6:
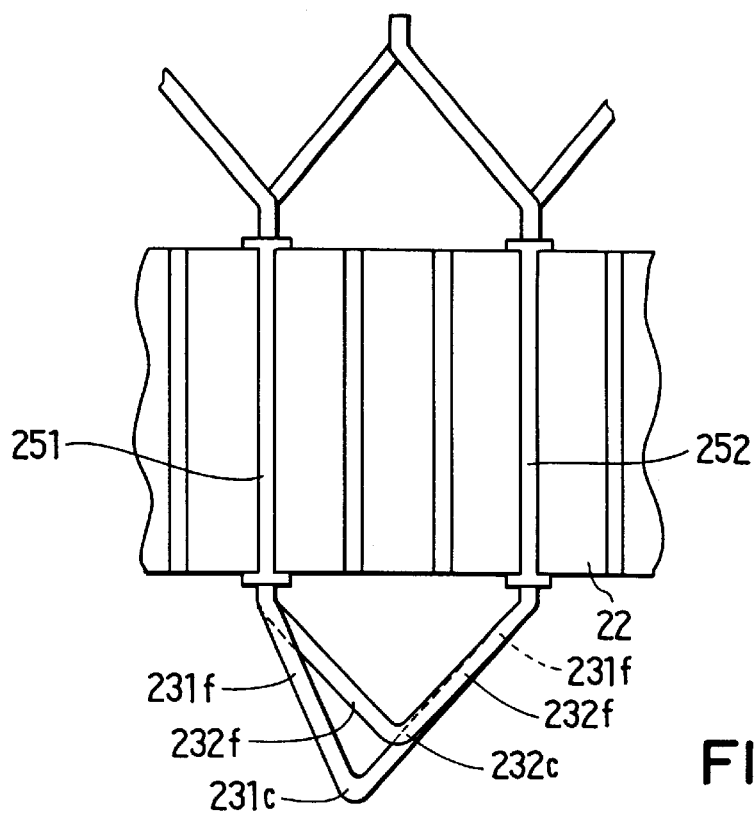
FIG. 6 is a fragmentary schematic side view of a variation of the stator.

As shown in FIG. 4, one of two inclined portions 231f of large segment 231 extending from slot 251 is made shorter than the other inclined portion 231f extending from slot 252 so that turn portion 231c is located near slot 251. On the other hand, one of two inclined portions 232f of small segment 232 extending from slot 251 is made longer than the other inclined portion 232f extending from slot 252 so that turn portion 232c included in the internal coil-end is located near slot 252. It is, of course, possible to locate turn portion 231c included in external coil-end near slot 252 and turn portion 232c included in internal coil-end near slot 251. It is also possible to locate turn portion 231c offset from the center between slot 251 and slot 252 as described above while turn portion 232c is located at the center between slot 251 and slot 252, as shown in FIG. 6.

Figure 7:
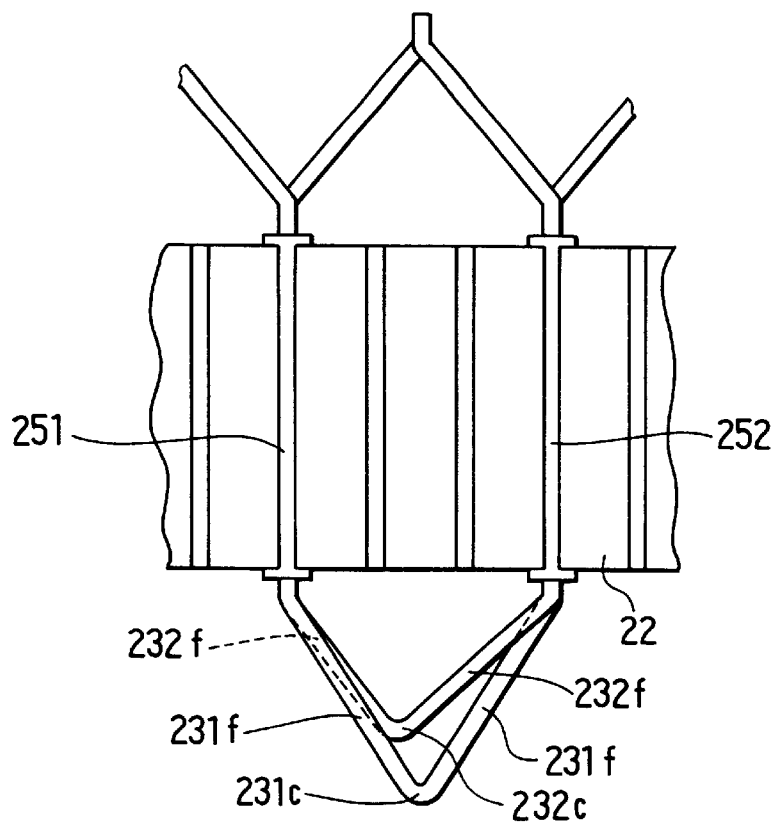
FIG. 7 is a fragmentary schematic side view of another variation of the stator.

As shown in FIG. 7, the length of two inclined portions 231f extending from turn portion 231c is made equal so that turn portion 231c can be located at the center between slot 251 and slot 252 while one of inclined portions 232f extending from turn portion 232c of small segment 232 is made longer than the other inclined portion 232f so that turn portion 232c is offset from the center between slot 251 and slot 252.

Thus, all the turn portions included in the external and internal coil-ends are disposed in double rings so that a sufficient circumferential distance between the coil-ends can be provided, thereby reducing resistance of passages of cooling air supplied by cooling fans 11 and 12 from the inside thereof to the outside thereof. The turn portions included in the internal coil-ends are exposed to the cooling air, so that the internal coil-ends can receive a sufficient amount of cooling air.

Since turn portions 231c and turn portions 232c are offset from the center between two slots (e.g. 251 and 252), the stator winding has mesh-like coil-ends surrounding rotor 3 with evenly distributed small gaps. As a result, noise caused by the cooling air passing through the stator winding can be effectively reduced.

As a variation, a stator winding having more than four conductor members in each slots and turn portions disposed in three rings can be provided according to the invention.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A stator of a vehicle AC generator comprising:

a stator core having a plurality of slots;

a stator winding including a plurality of pairs of U-shaped conductor segments, each of said plurality of pairs of U-shaped conductor segments having a first pair of in-slot portions disposed in one of said slots and a second pair of in-slot portions disposed in another of said slots slot spaced apart from said one of the slots, a first turn portion and a second turn portion enclosed by said first turn portion, wherein said first turn portion and second turn portion are shifted from one another in the circumferential direction.

2. The stator as claimed in claim 1, wherein said first turn portion and said second turn portion are alternately disposed in the circumferential direction on an end of said stator core.

3. The stator as claimed in claim 2, wherein said first segment includes the same two coil-end portions having the same length which extend from two of said slots and join together at said first turn portion, and said second segment includes different two coil-end portions having different lengths which extend from two of said slots and join together at said second turn portion.

4. The stator as claimed in claim 2, wherein said first segment has first two coil-end portions having a first ratio of length therebetween, said second segment has second two coil-end portions having a second ratio of length therebetween, and said first ratio and second ratio are different from each other.

5. A stator of a vehicle AC generator comprising:

a stator core having a plurality of slots; and a stator winding including a plurality of pairs of U-shaped large conductor segments and U-shaped small conductor segments, each pair of which is disposed in one of said slots, said large conductor segments having first turn portions forming a ring on one end of said stator core and second turn portions being enclosed by said first turn portions and forming another coaxial ring on the same end, said first turn portions and second turn portions being shifted from one another in the circumferential direction.

6. A stator of a vehicle AC generator comprising a stator core having a plurality of slots and a stator winding having a plurality of pairs of U-shaped large conductor segments and U-shaped small conductor segments each pair of which is disposed in one of said slots, wherein each of said large conductor segments has first turn portion and two inclined portion extending from two of said slots joining at said first turn portion, each of said small conductor segments has second turn portion and two inclined portion extending from two of said slots joining at said first turn portion, said first turn portion forms a ring together with other first turn portions on one end of said stator core, said second turn portion is enclosed by one of said first turn portions and forms another coaxial ring together with other second turn portions on the same end of said stator core, and said first turn portions and second turn portions are shifted from one another in the circumferential direction.

* * * * *